United States Patent [19]
Yee

[11] Patent Number: 6,055,170
[45] Date of Patent: Apr. 25, 2000

[54] PREDICTION METHODS AND CIRCUITS FOR OPERATING A TRANSISTOR AS A RECTIFIER

[75] Inventor: H. P. Yee, Seattle, Wash.

[73] Assignee: SRMOS, Inc., Seattle, Wash.

[21] Appl. No.: 09/042,208

[22] Filed: Mar. 13, 1998

Related U.S. Application Data

[60] Provisional application No. 60/048,288, Jun. 2, 1997.

[51] Int. Cl.[7] ................................................. H02M 7/217
[52] U.S. Cl. ............................................. 363/89; 363/127
[58] Field of Search ....................................... 363/89, 127

[56] References Cited

U.S. PATENT DOCUMENTS

| | | | |
|---|---|---|---|
| 4,870,555 | 9/1989 | White | 363/127 |
| 5,424,932 | 6/1995 | Inou et al. | 363/89 |
| 5,430,640 | 7/1995 | Lee | 363/127 |
| 5,523,940 | 6/1996 | Wymelenberg | 363/127 |
| 5,528,480 | 6/1996 | Kikinis et al. | 363/89 |
| 5,742,491 | 4/1998 | Bowman et al. | 363/89 |

*Primary Examiner*—Jeffrey Sterrett
*Attorney, Agent, or Firm*—Claude A.S. Hamrick; Emil Chang; Oppenheimer Wolff & Donnelly LLP

[57] ABSTRACT

Circuits and methods are provided for operating a transistor as rectifier based upon the detected Vds of the transistor. In sensing the Vds voltage of the SRMOS, during positive conduction, the SRMOS body diode will conduct and the Vds of the SRMOS becomes that of a forward body diode voltage, which may, depending on the type of the device, be approximately –0.6V. If this voltage level is sensed, it may indicates that the SRMOS is turned off too early. During reverse conduction, Vds is non-existent (which is similar to a diode). In this case, the SRMOS may be turned off too late. Thus, by examining Vds, the SRMOS can be operated in such a manner so that it is turned off at an optimal point in time.

43 Claims, 9 Drawing Sheets

US 6,055,170

PREDICTION METHODS AND CIRCUITS FOR OPERATING A TRANSISTOR AS A RECTIFIER

PRIORITY CLAIM

This application claims priority to a provisional application entitled "SRMOS Control in DC/DC Power Converters" filed 0n Jun. 2, 1997, having an Application No. 60/148,288.

BACKGROUND OF THE INVENTION

1. Field of the Invention

The present invention generally relates to electrical rectifying circuits and, in particular, to rectifying circuit that uses a transistor as a rectifier.

2. Description of the Prior Art

In power converters, synchronous rectifier MOS (SRMOS) transistors are used and operated in such a manner to perform like a diode, allowing conduction in one direction and preventing conduction in the opposite direction. The advantage with using an SRMOS transistor in the place of a diode is the higher efficiency obtainable with an SRMOS— namely the avoidance of the voltage drop across a conventional diode. This advantage becomes increasing important as greater demand and operation time is demanded from a limited power source such as batteries. In the case of a converter circuit, it becomes even more crucial that there is minimal voltage drop in converting one voltage level to another voltage level. Otherwise, a great deal of power would be lost in the conversion process itself.

Traditionally, SRMOS are controlled by several methods. Referring to FIG. 1a, a prior art converter circuit with a SRMOS is illustrated. This circuit is comprised of a first transistor 10 having gate, drain and source terminals, and the transistor is connected at one terminal to a voltage source having a particular voltage level and is connected at another terminal in series to a coil 12, and to a capacitor 16. A second transistor 18, being operated as a synchronous rectifier (SRMOS), is connected at one terminal to a node between the first transistor 10 and the coil 12 and is connected at another terminal to the common ground terminal. A pulse width modulation (PWM) control circuit 20, having a probe at the output terminal 22, detects the output voltage level. The PWM control circuit operates transistors 10 and 18 in response to the detected voltage level and causes the generation of the desired voltage level at the output terminal. Transistors 10 and 18 are controlled by a common signal and transistor 18 is connected via an inverter 14. When transistor 10 is turned on, transistor 18 is turned off. In some cases, an optional external diode is placed across transistor 10.

In this type of circuit, referring to FIG. 1b illustrating the gate voltage for transistor 10 (which is being operated as the main switch for generating the desired output voltage level) and FIG. 1c illustrating the gate voltage in operating the SRMOS (transistor 18) and FIG. 1d illustrating the current in the inductor 12, the SRMOS (transistor 18) is turned on whenever the main converter switch (transistor 10) is turned off (as indicated at 24), and the SRMOS (transistor 18) is turned off whenever the main converter switch (transistor 10) is turned on. While this is a simple arrangement, when the SRMOS is turned on, there is a large amount of reverse conduction (current flow indicated at 28) that reduces overall converter efficiency.

In yet another prior art circuit, referring to FIG. 2a, a SRMOS converter circuit using the current sense control method is illustrated. This circuit is comprised of a first transistor 30 having gate, drain and source terminals, where the transistor is connected at one terminal to a voltage source having a particular voltage level and is connected at another terminal in series to a coil 32, a shunt 34 (for current sensing), and a capacitor 36. A second transistor 38, being operated like a synchronous rectifier, is connected at one terminal to a node between the first transistor 30 and the coil 32 and is connected at the other terminal to the common ground terminal. A pulse width modulation (PWM) control circuit 40, having two probes for current sensing across the shunt 34 and a probe at the output terminal 42, detects the current level and the output voltage level. The PWM control circuit operates transistors 30 and 38 in response to the detected voltage and current levels and causes the generation of the desired voltage level at the output terminal 42.

In this type of circuit, referring to FIG. 2b illustrating the timing of the gate voltage for transistor 30 and FIG. 2c illustrating timing of the gate voltage in operating the SRMOS (transistor 38) and FIG. 2d illustrating current flow of the inductor, in the discontinuous mode when there is reverse conduction and the inductor current starts to flow in the negative direction through the SRMOS (transistor 38), current flow is sensed through the use of the shunt 34. The control circuit 40 sensing reverse conduction turns off the SRMOS (transistor 38) to prevent further reverse conduction. However, since the shunt resistance is typically very small, it is difficult to precisely detect the timing of the zero crossing of the current. Thus, the SRMOS is turned off either before the zero crossing or after the zero crossing, rendering this an imprecise method. Because this is an imprecise method, there still may be a large amount of negative current flow (as indicated in FIG. 3d, 48). Additionally, the shunt is a resistor which consumes power as well (lossy). While the typical shunt resistor is 33 mΩ and the power consumption can be reduced by using a shunt with even smaller resistance, with a smaller shunt, there will be more reverse conduction before the negative current can be detected. Overall, this circuit is not a reliable nor efficient converter circuit.

In still yet another prior art circuit, referring to FIG. 3a, a SRMOS converter circuit using Vds sensing control method is illustrated. This circuit is comprised of a first transistor 50 having gate, drain and source terminals, where the transistor is connected at one terminal to a voltage source having a particular voltage level and is connected at another terminal in series to a coil 52, and the coil is connected to a capacitor 56. A second transistor 58, being operated like a synchronous rectifier, is connected at one terminal to a node between the first transistor 50 and the coil 52 and is connected at the other terminal to the common ground terminal. A pulse width modulation (PWM) control circuit 60, having a probe 54 for voltage sensing at a node between transistor 50 and coil 52 and a probe at the output terminal 62, detects the Vds level and the output voltage level. The PWM control circuit operates transistors 50 and 58 in response to the detected voltage levels and causes the generation of the desired voltage level at the output terminal 62.

FIG. 3b illustrates the timing of the gate voltage for transistor 50 of FIG. 3a, FIG. 3c illustrates timing of the gate voltage in operating the SRMOS (transistor 58) in view of the FIG. 3b, and FIG. 3d illustrates current flow of this circuit. In this type of circuit, in the discontinuous mode when there is reverse conduction and the inductor current starts to flow in the negative direction through the SRMOS (transistor 58), the SRMOS drain voltage (Vds) becomes positive which is sense by the control circuit 60 and the control circuit turns the SRMOS off. However, in practice, precise Vds sensing is difficult and reverse conduction occurs (as shown in FIG. 3d, 64), rendering this type of circuit unreliable and inefficient.

Given the state of the art and the demand for a more efficient converter circuit, it would be desirable to have a method and circuit that can perform rectifying function and prevent the occurrence of reverse conduction through the use of a transistor.

SUMMARY OF THE INVENTION

It is therefore an object of the present invention to provide circuits and methods for operating a transistor as a rectifier.

It is another object of the present invention to provide circuits and methods for operating a transistor as a rectifier using the Vds voltage potential of the transistor as an indicator.

It is yet another object of the present invention to provide circuits and methods for operating a transistor as a rectifier and preventing reverse conduction by said transistor while allowing forward conduction.

Briefly, circuits and methods are provided for operating a transistor as a rectifier based upon the detected Vds of the transistor. In sensing the Vds voltage of the SRMOS during the off-state, during positive conduction (of the transistor), the SRMOS body diode conducts and the Vds of the SRMOS becomes that of a forward body diode voltage, which may, depending on the type of the device, be approximately –0.6V. If this voltage level is sensed, it may indicate that the SRMOS is turned off too early. During reverse conduction, Vds is non-existent (which is similar to a diode). In this case, the SRMOS may be turned off too late. Thus, by examining Vds, the SRMOS can be operated in such a manner so that it is turned off at an optimal point in time.

An advantage of the present invention is that it provides circuits and methods for operating a transistor as a rectifier.

Another advantage of the present invention is that it provides circuits and methods for operating a transistor as a rectifier using the Vds voltage potential of the transistor as an indicator.

Yet another advantage of the present invention is that it provides circuits and methods for operating a transistor as a rectifier and preventing reverse conduction by said transistor while allowing forward conduction.

These and other features and advantages of the present invention will become well understood upon examining the figures and reading the following detailed description of the invention.

IN THE DRAWINGS

FIG. 1b illustrates the gate voltage for operating the main switch transistor of FIG. 1a;

FIG. 1c illustrates the gate voltage in operating the SRMOS of FIG. 1a;

FIG. 2b illustrates the timing of the gate voltage in operating the main switch transistor of FIG. 2a;

FIG. 2c illustrates the timing of the gate voltage in operating the SRMOS of FIG. 2a;

FIG. 3b illustrates the timing of the gate voltage in operating the main switch transistor of FIG. 3a;

FIG. 3c illustrates the timing of the gate voltage in operating the SRMOS of FIG. 3a;

FIG. 4b illustrates the Vgs for operating the SRMOS of the preferred method in view of FIG. 4a;

Figure 8A:
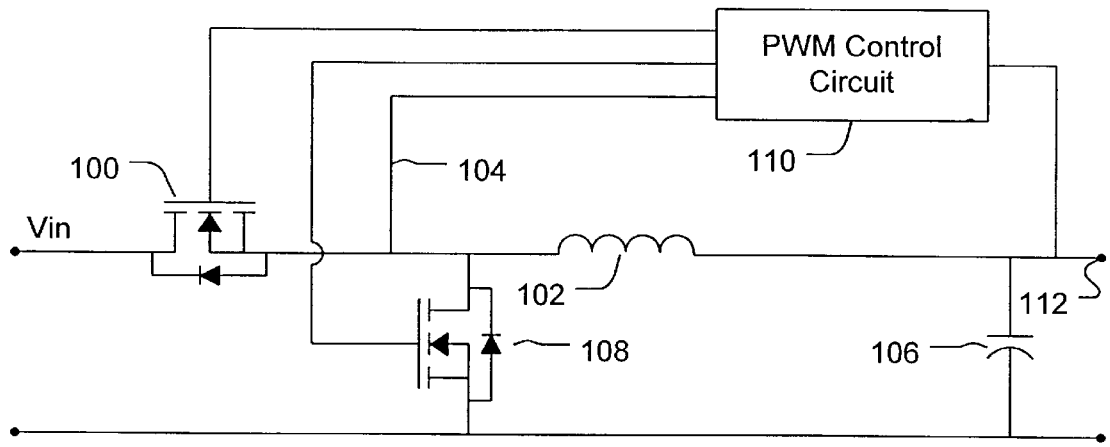
FIG. 8a illustrates one circuit embodiment for a buck DC/DC converter of the present invention.
Figure 8B:
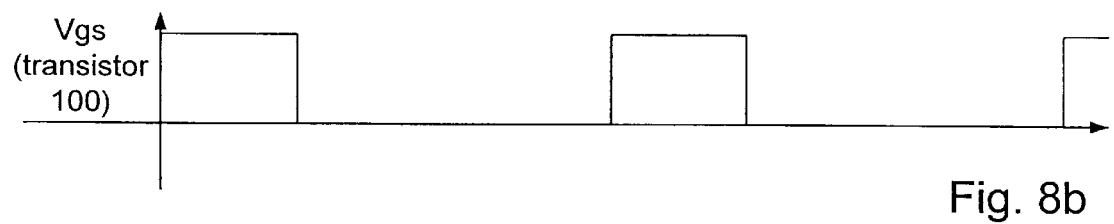
Figure 8C:
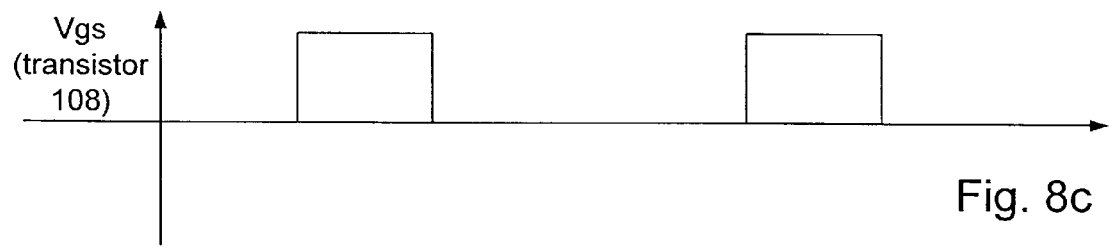
Figure 8D:
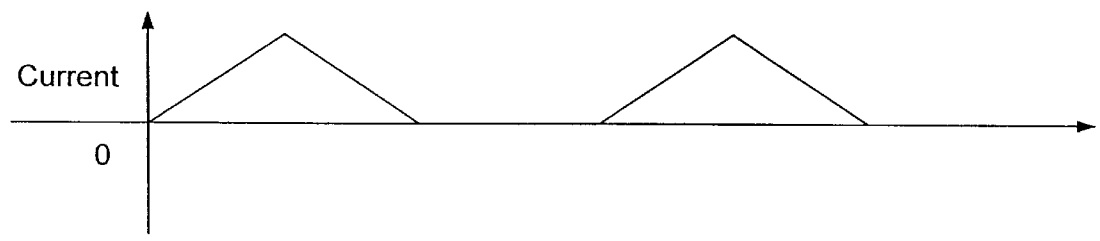
Figure 9:
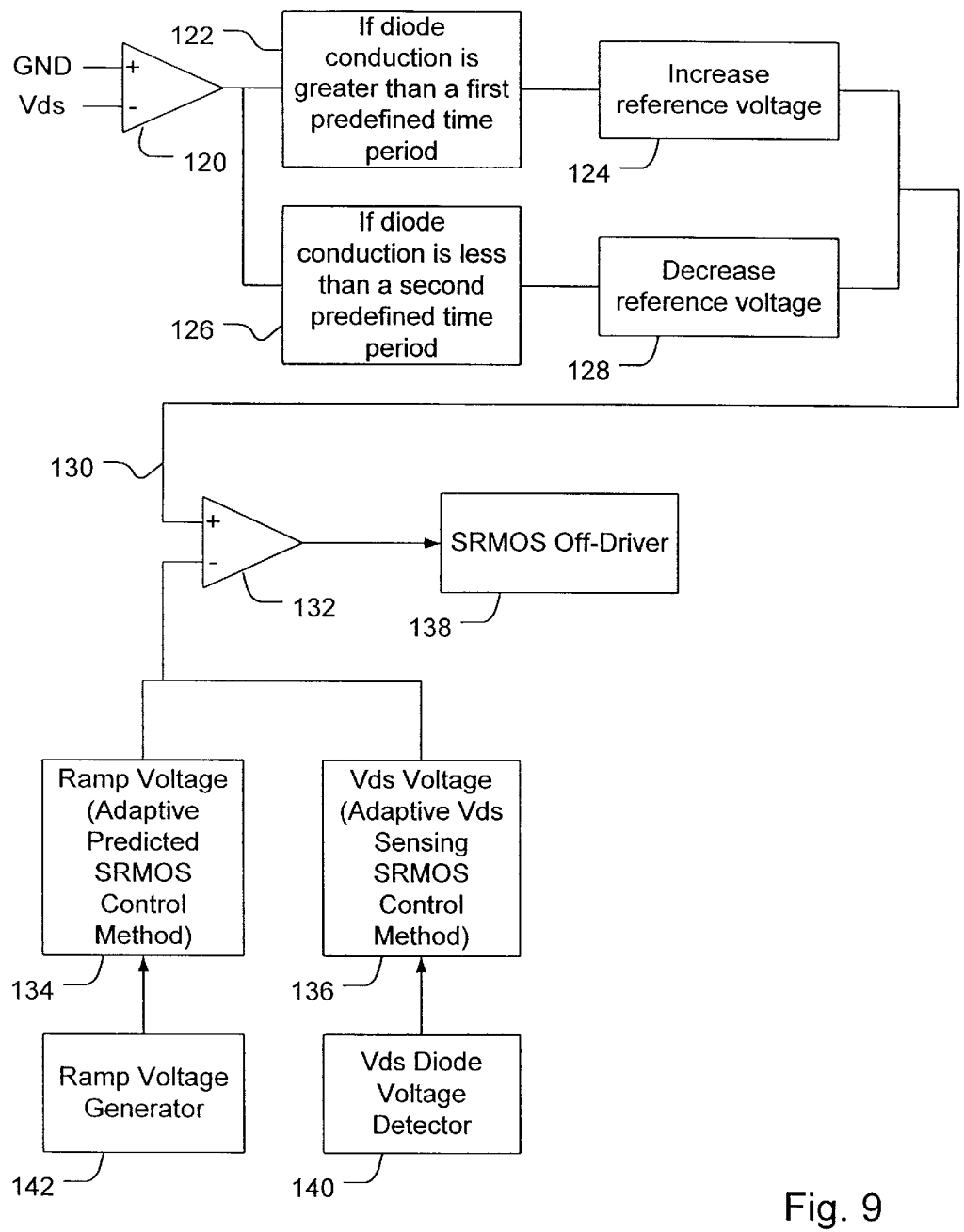
Figure 10A:
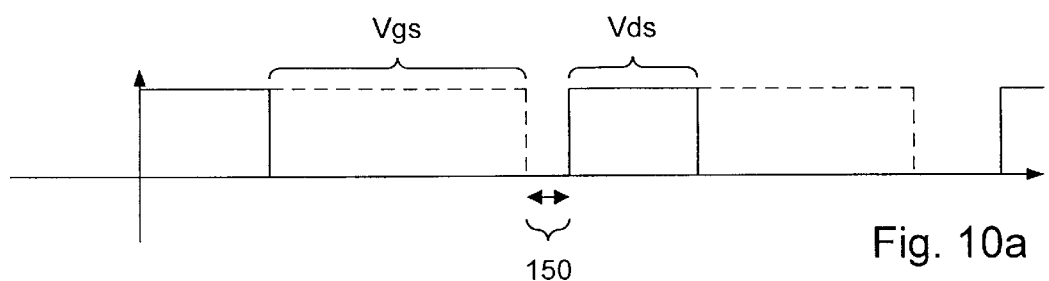
Figure 10B:
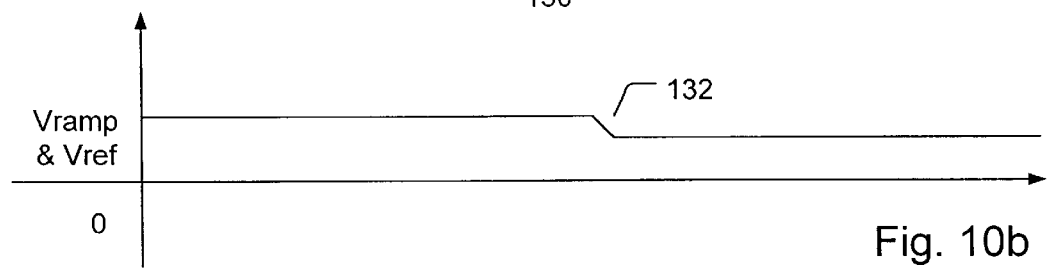
Figure 11:
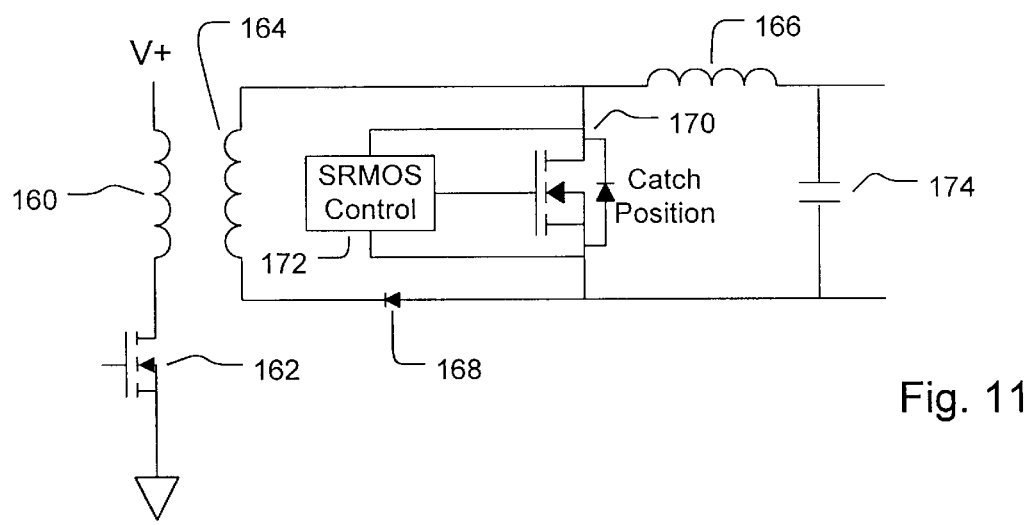
Figure 12:
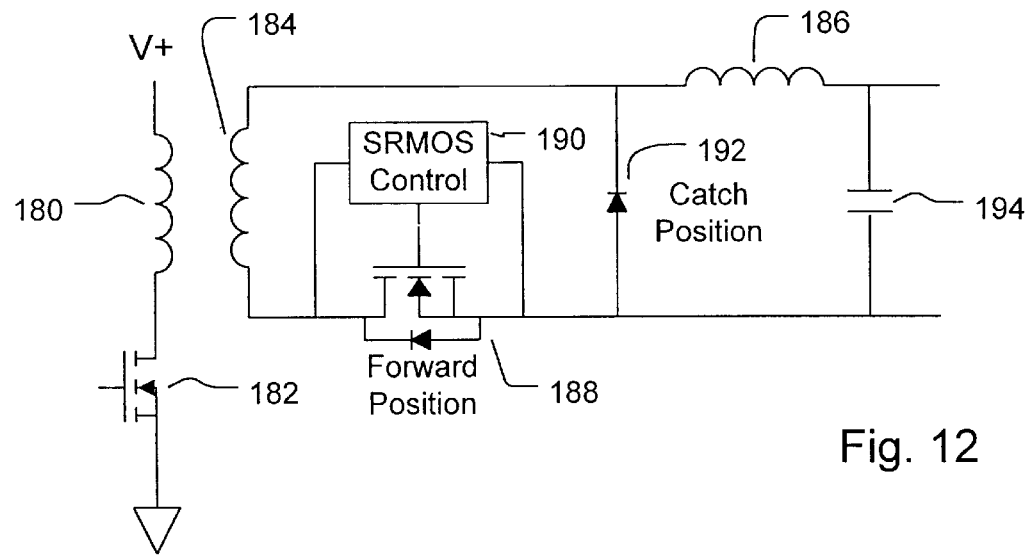
Figure 13:
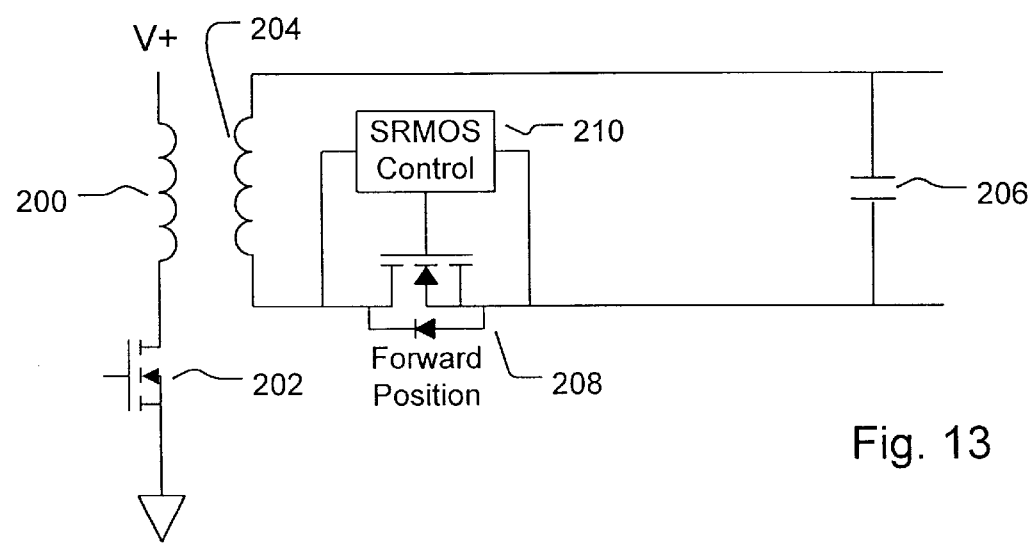

FIGS. 8b, 8c, and 8d illustrate the relationship between Vgs of the main switch transistor, Vgs of the SRMOS transistor, and current flow of the circuit showing no reverse conduction;

FIG. 9 illustrates an embodiment for the control circuit to control the SRMOS;

FIGS. 10a and 10b illustrate the adjustment of Vref when there is a rapid change in load; and FIGS. 11–13 illustrate applications of the present invention in converter circuits.

DETAILED DESCRIPTION OF THE PREFERRED EMBODIMENTS

In a presently preferred embodiments of the present invention, an adaptive predicted SRMOS control method and an adaptive Vds sensing SRMOS control method are disclosed. By using either of these methods, reverse conduction is significantly reduced or even eliminated. In each method, a reference voltage is provided and adjusted so that the SRMOS is turned off optimally when there is very short body diode conduction and no reverse conduction.

A MOSFET transistor operated as a rectifier is referred to as a SRMOS. During the off-state of the transistor, there is no current going from the drain terminal to the source terminal. However, there can be a voltage difference across the two terminals (Vds). If the voltage potential at the drain terminal is higher than the voltage potential at the source terminal, Vds voltage would be the difference between the two voltage potentials. If the voltage potential at the source terminal is higher than the voltage potential at the drain terminal, Vds voltage would be the forward body diode voltage of the transistor or that of an external diode if an external diode is connected across the two terminals.

More specifically, in sensing the Vds voltage of the SRMOS, during positive conduction (current going from source to drain), the SRMOS body diode will conduct and the Vds of the SRMOS becomes that of a forward body diode voltage of the transistor or of that of a connected external diode, which may, depending on the type of the device, be approximately −0.6V. If this voltage level is sensed, it may indicate that the SRMOS is turned off too early. During reverse conduction (current going from drain to source), Vds is near-zero. In this case, the SRMOS may be turned off too late. Thus, by examining Vds, the SRMOS can be operated in such a manner so that it is turned off at an optimal point in time.

A reference voltage for determining the timing in turning off the SRMOS is provided to accurately gauge the turn-off time for the SRMOS. The reference voltage can be provided by using a capacitor voltage where the capacitor voltage is increased to delay the SRMOS turn-off time when a Vds forward body diode voltage is detected and the capacitor voltage is decreased to turn off the SRMOS earlier in time when no Vds forward body diode voltage is detected or the duration of a detected forward body diode voltage is shorter than a predefined time period.

Figure 1A:
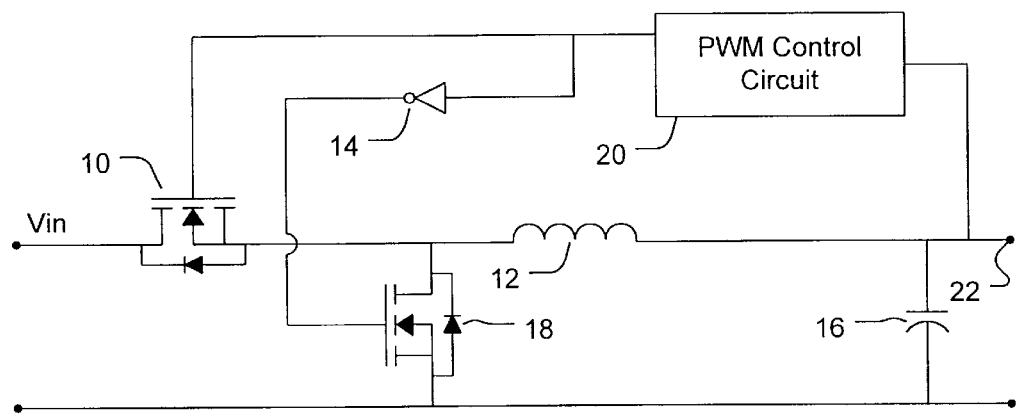
FIG. 1a illustrates a prior art SRMOS converter circuit using a simple switch method.
Figure 1B:
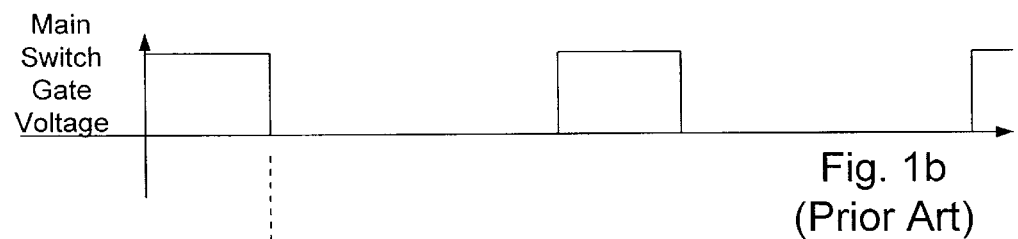
Figure 1C:
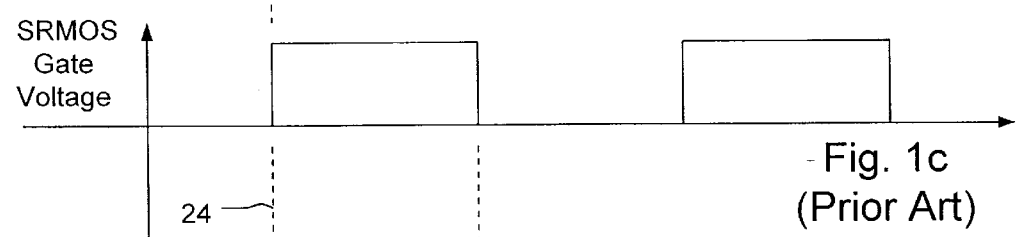
Figure 1D:
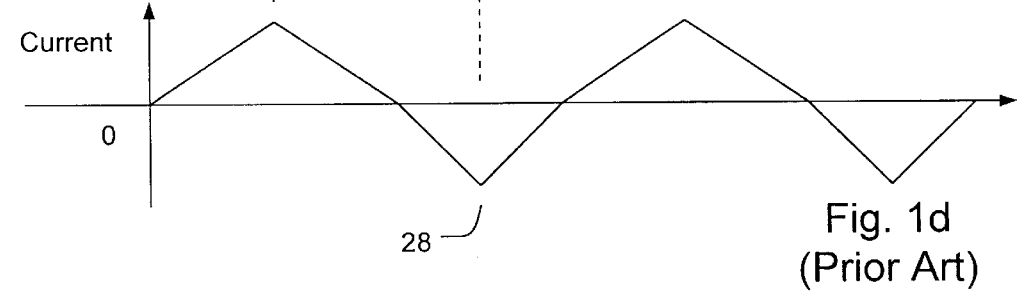
FIG. 1d illustrates the current of the FIG. 1a circuit.
Figure 2A:
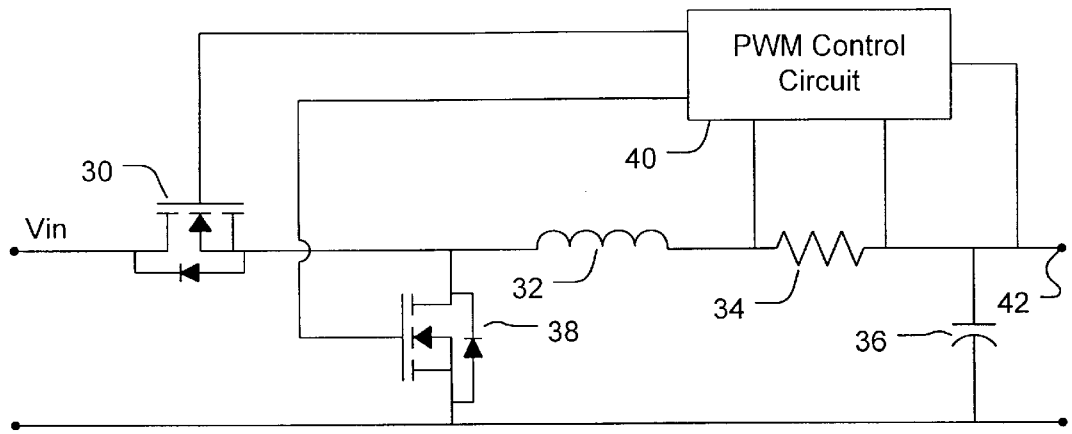
FIG. 2a shows a prior art SRMOS converter circuit using the current sense control method.
Figure 2B:
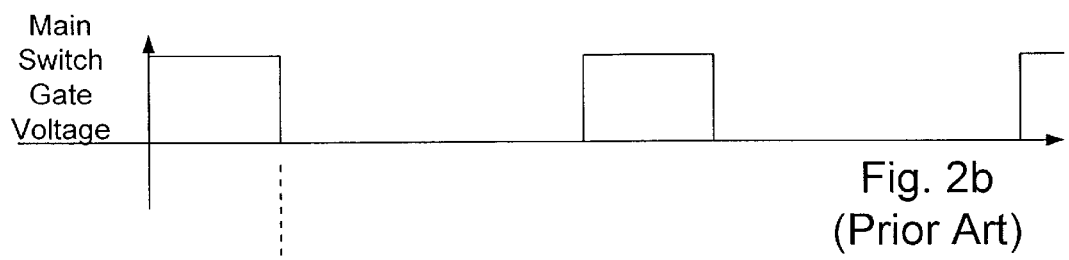
Figure 2C:
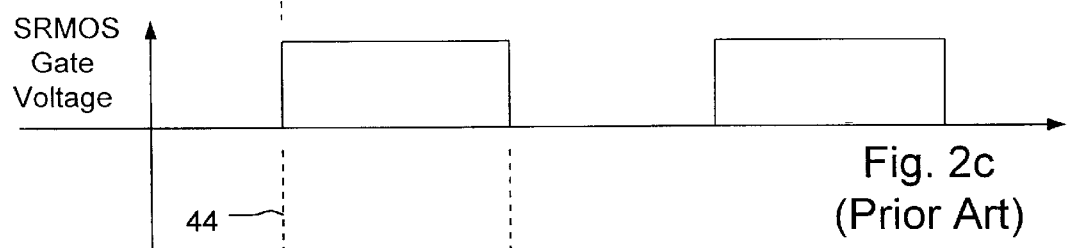
Figure 2D:
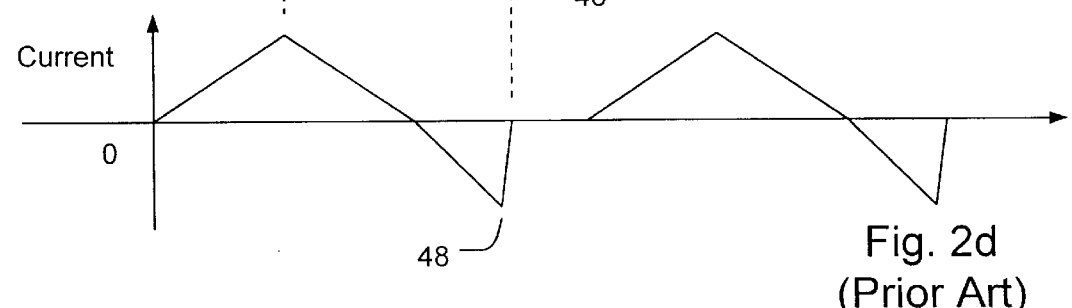
FIG. 2d illustrates the current flow of the FIG. 2a circuit.
Figure 3A:
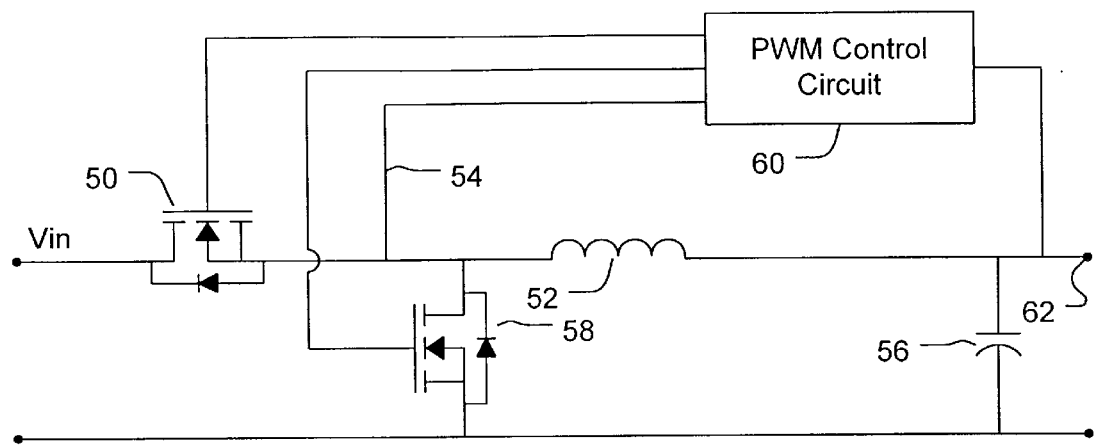
FIG. 3a illustrates a SRMOS converter circuit using Vds sensing control method.
Figure 3B:
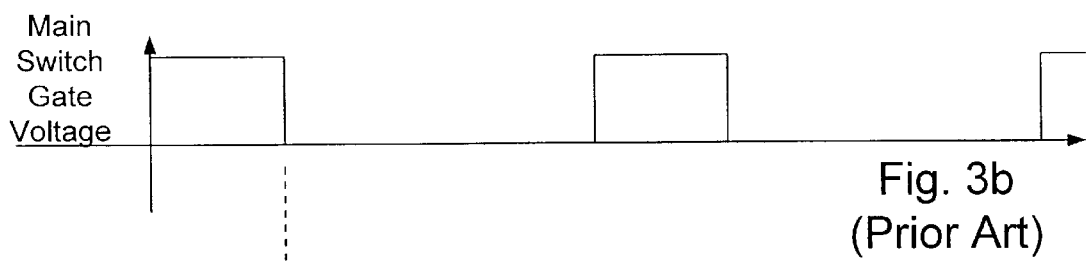
Figure 3C:
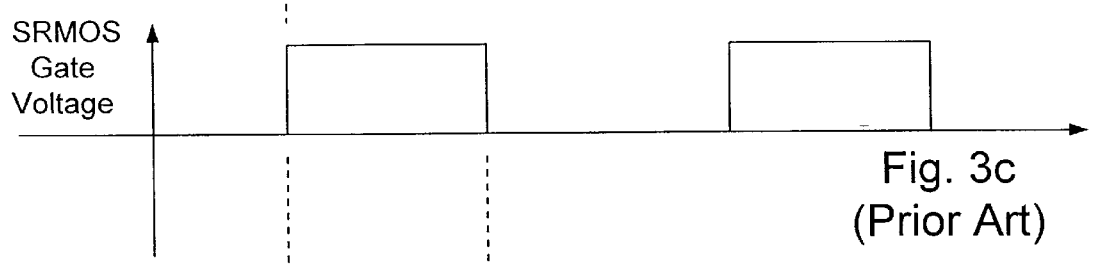
Figure 3D:
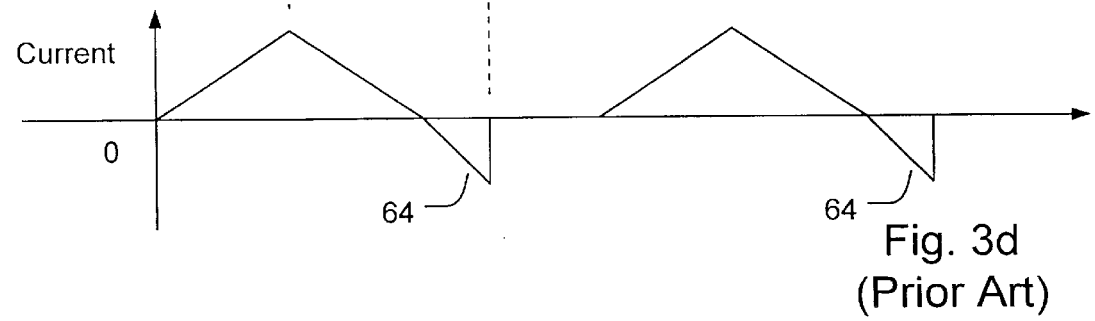
FIG. 3d illustrates the current flow of the FIG. 3a circuit.
Figure 4A:
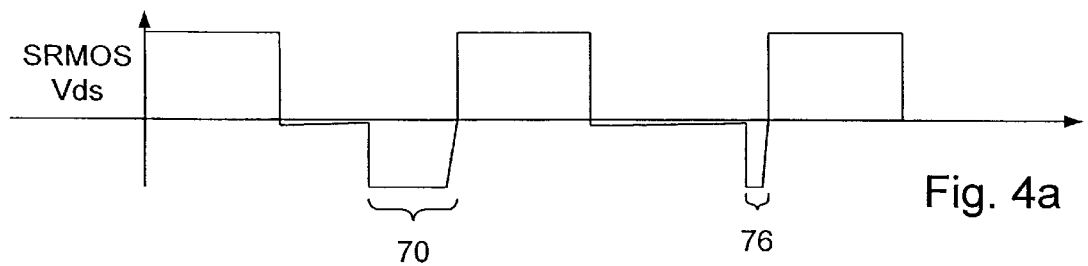
FIG. 4a illustrates the Vds of the SRMOS of the preferred method of the present invention.
Figure 4B:
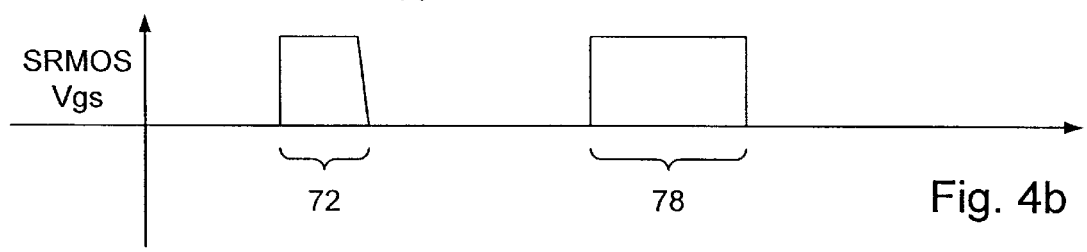
Figure 4C:
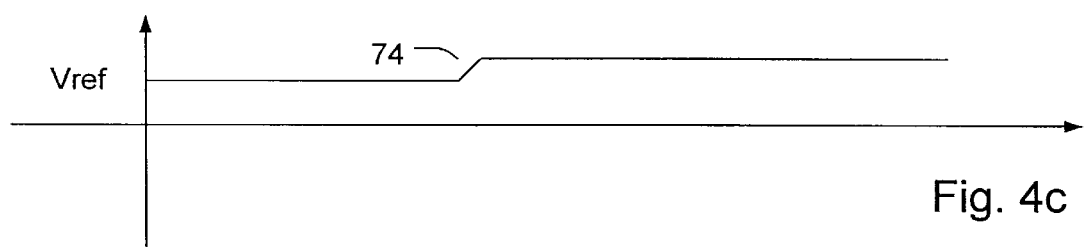
FIG. 4c illustrates the reference voltage, Vref, for the preferred method of the present invention.

Referring to FIGS. 4a, 4b, and 4c, FIG. 4a illustrates Vds of the SRMOS, FIG. 4b illustrates the Vgs in operating the SRMOS, and FIG. 4c illustrates reference voltage, Vref. Referring to FIGS. 4a, 4b and 4c, the SRMOS is turned off too early in time (by applying Vgs as indicated at 72) such that a diode conduction (as indicated at 70) occurs (Vds approximately equals to the forward body diode voltage). When the reference voltage is adjusted upwards (as indicated at 74), the SRMOS is turned off at a later point in time (as indicated at 78), resulting in minimal diode conduction 76.

In determining the point in time to turn off the SRMOS, in one method the reference voltage is compared against a periodic ramp voltage (Vramp). When Vramp exceeds Vref, a signal is generated to turn off the SRMOS. The ramp voltage can be generated in one of several ways. It can be generated as a function of the PWM signal, the Vds signal of the SRMOS, or in other manners.

Figure 5A:
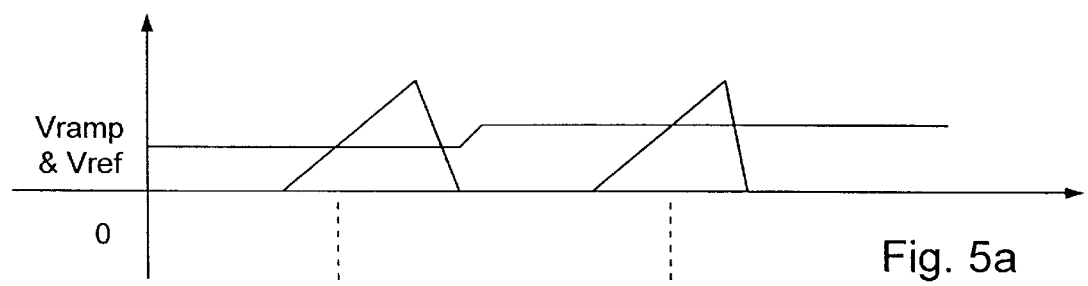
FIG. 5a illustrates Vramp and Vref of the preferred method showing the upward adjustment of Vref.
Figure 5B:
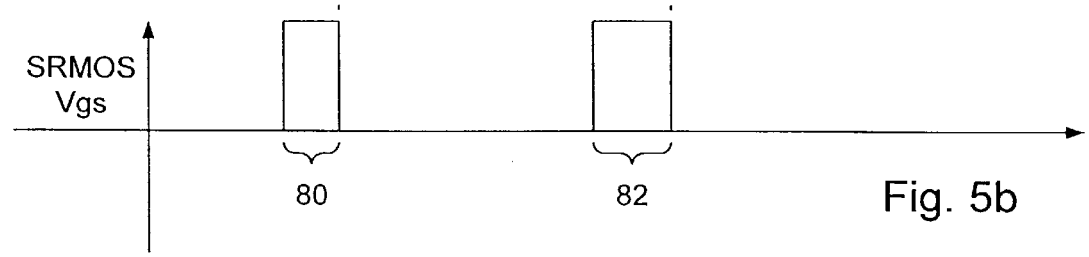
FIG. 5b illustrates Vgs of the SRMOS in relation with the intersection of Vramp and Vref of FIG. 5a of the preferred method.

In using a generated or PWM ramp voltage in conjunction with the reference voltage, a time-based, predicted SRMOS turn off signal can be generated where this signal is based upon the previous SRMOS timing. If the converter duty cycle quickly changes, a few cycle is required to adjust Vref in relation with Vramp for turning off the SRMOS. FIG. 5a illustrates Vramp and Vref showing the upward adjustment of Vref. FIG. 5b illustrates the Vgs of the SRMOS in relation with the intersection of Vramp and Vref of FIG. 5a. As Vref is upwardly adjusted on Vramp, Vgs is prolonged and the SRMOS on-time is increased (82), and as Vref is downwardly adjusted on Vramp, Vgs is shortened and the SRMOS on-time is decreased (80).

Figure 6A:
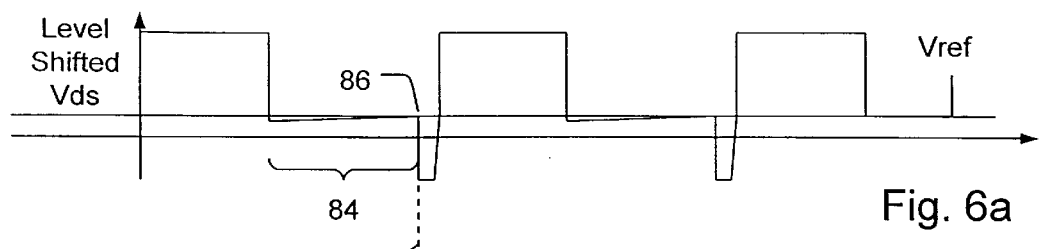
FIG. 6a shows the intersection of Vds and Vref for turning off of the SRMOS on the upward slope of the Vds.
Figure 6B:
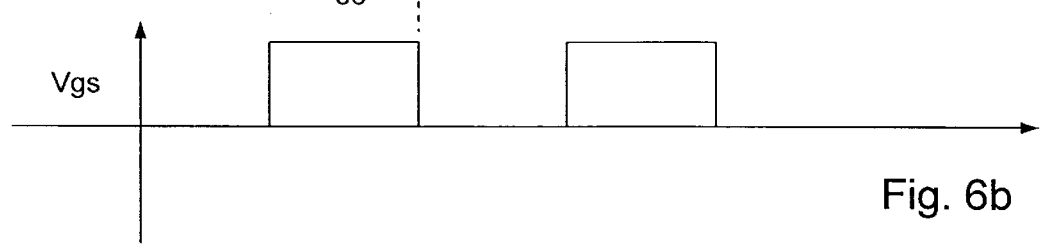
FIG. 6b illustrates that when Vref and Vds are at the same level Vgs is applied to turn off the SRMOS.

In the adaptive Vds sensing SRMOS control method, referring to FIG. 6a illustrating Vds and Vref, the reference voltage is compared with Vds and the SRMOS is turned off when Vref, on the upward slope of the Vds (as indicated at 84), meets Vref (as indicated at 86). Referring to FIG. 6b, when Vref and Vds are the same (as Vds increases in value), Vgs is applied to turn off the SRMOS (as indicated at 88). In this method, no ramp voltage is necessary. The reference voltage is provided so that the circuit does not need to precisely determine the zero-crossing point. Additionally, any component offset voltage resulting from the manufacturing process or operating conditions can be accounted for by adjusting the reference voltage.

Once the SRMOS turn-off time is optimal, the on-time of the SRMOS can be used to determine the load condition of the converter. When the load condition is known, other power saving techniques can be applied to further optimize converter output.

Figure 7A:
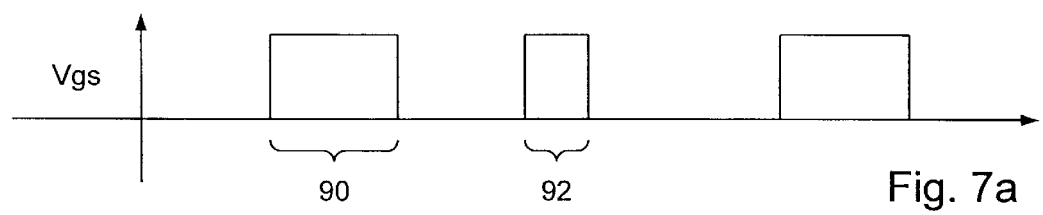
FIG. 7a shows that the duration of the SRMOS on-time is reduced as the load is reduced.
Figure 7B:
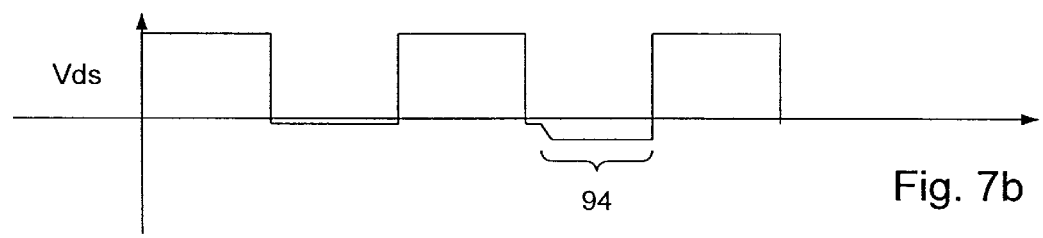
FIG. 7b shows that an increase in the duration of diode conduction indicates an increased load and the on-time of the SRMOS Vgs is increased to handled the increased load.

In detecting the load condition, at full load the SRMOS will remain on until the main converter switch is turned on. As the load decreases, the SRMOS turns off before the main converter switch is turned on. Therefore, the on-time of SRMOS indicates the load condition. Once the load condition is known, other power saving methods can be used. For example, in light load condition, the amount of on-time of the main converter switch (and/or the SRMOS) can be reduced, the SRMOS function can be replaced with the body diode or external diode, and the converter operating frequency can be reduced. Referring to FIG. 7a, the duration of the SRMOS on-time is reduced as indicated at 90 and 92 as the load is reduced. On the other hand, referring to FIG. 7b, an increase in the duration of diode conduction (as indicated at 94) indicates an increased load and the on-time of the SRMOS Vgs can be increased to handled the increased load.

FIG. 8a illustrates one circuit embodiment for a buck DC/DC converter of the present invention where the methods for operating the SRMOS (transistor 108) are novel and can be embedded in the PWM control circuit. The methods described herein can be used in buck, boost, and other types of converters. FIGS. 8b, 8c, and 8d illustrate the relationship between Vgs of transistor 100, Vgs of transistor 108, and current flow of the circuit which shows no reverse conduction.

FIG. 9 illustrates one embodiment of the PWM control circuit for the present invention. A comparator 120 compares the detected Vds and ground to determine the existence of Vds at the level of a forward diode voltage potential. If Vds equals the forward body diode voltage for a duration longer than a first predefined time period (122), the reference voltage described above (Vref) is increased (124). If Vds equals the forward body diode voltage for a duration less than a second predefined time period (126), the reference voltage is decreased (128). Vref 130 is then compared to another signal at comparator 132. The other signal, depending on the embodiment, can be from one of two possible methods. In the is adaptive, predicted SRMOS control method as described above, there is a ramp voltage Vramp and Vramp is used as an input to the comparator 132. In the adaptive Vds sensing SRMOS control method described above, Vds is used as an input to the comparator 132. In either case, if Vref equals to the provided signal (either Vramp or Vds), a signal is provided to the Off-Driver 138 for the SRMOS to turn off the SRMOS.

In a situation where there is a rapid change in converter load, the prediction circuit may not be able to adjust to this rapid change, and reverse conduction may result. In order to provide for this situation, in yet another aspect of the present invention and referring to FIGS. 10a and 10b, the SRMOS Vds and Vgs voltages are examined and compared. If the falling edge of Vgs is ahead of the rising edge of Vds for less than some predetermined amount of time 150, the reference voltage is quickly reduced 152.

FIGS. 11–13 illustrates application of the present invention in alternative circuit configurations. Referring to FIG. 11 illustrating a forward converter having a primary coil 160 operated by a transistor 162, a secondary coil 164 connected in series with a coil 166 and a diode 168, a SRMOS transistor 170 controlled by a SRMOS Control circuit 172 and connected in parallel with the secondary coil 164 and a capacitor 174, the SRMOS transistor is placed in the catch position of the converter circuit and it is controlled in such a manner so that it is on for the optimal maximum duration while avoiding reverse conduction. FIG. 12 illustrates another forward converter configuration having a primary coil 180 operated by a transistor 182 and a secondary coil 184 connected in series with a coil 186 and a SRMOS transistor 188 that is operated by a SRMOS Control circuit 190, and connected in parallel with a diode 192 and a capacitor 194, where the SRMOS transistor is placed in the forward position. With this configuration, the forward converter avoids reverse conduction and can be used in parallel converter applications. Referring to FIG. 13 illustrating a converter having a primary coil 200 operated by a transistor 202, a secondary coil 204 connected in series with a capacitor 206 and a SRMOS transistors 208 that is operated by a SRMOS Control circuit 210, the present invention enables the use of a SRMOS in a flyback converter where traditionally SRMOS are not easily implemented.

It is important to note that the present invention can be used in a variety of applications including periodic switching applications, and it is not limited to converters or the embodiments described herein. Furthermore, the methods described herein can be used in conjunction with prior art methods. For example, the current across the drain and source terminals of the SRMOS transistor can be sensed for reverse current flow, and the prediction methods and circuits (e.g. ramp voltage and reference voltage) of the present invention can be adapted to adjust the operation of the SRMOS so that the transistor is operated in such a manner so there is no reverse current flow in subsequent cycles. More specifically, the reference voltage can be adjusted on one hand by detecting for reverse current flow when there is reverse current flow and for Vds at a diode voltage when there is no reverse current flow but the transistor is turned off too early.

Moreover, although the description provides for the adjustment of the reference voltage with respect to the ramp voltage or the adjustment of the reference voltage with respected to the Vds voltage, it is entirely within the teaching of the present invention to provide for other types of reference voltage combinations for operating the SRMOS transistor, including the adjustment of the ramp voltage rather than the reference voltage and the use and adjustment of other types of voltage signals such a saw-tooth signal.

While the present invention has been described with reference to certain preferred embodiments, it is to be understood that the present invention is not to be limited to such specific embodiments. Rather, it is the inventor's intention that the invention be understood and construed in its broadest meaning as reflected by the following claims. Thus, these claims are to be understood as incorporating and not only the preferred embodiment described herein but all those other and further alterations and modifications as would be apparent to those of ordinary skill in the art.

What I claim is:

1. A circuit for operating a transistor as a rectifier, said circuit comprising:
   a transistor;
   a control circuit operating said transistor as a function of the detected Vds voltage potential of said transistor, said control circuit having a reference signal and adjusting said reference signal when said detected Vds voltage is at a diode voltage for a duration different than a predefined time period.

2. A circuit as recited in claim 1 wherein said control circuit adjusts said reference signal downward when said detected Vds voltage is at a diode voltage potential for a duration less than a second predefined time period.

3. A circuit as recited in claim 2 wherein said diode voltage potential is the forward body diode voltage of said transistor.

4. A circuit as recited in claim 2 wherein said diode voltage potential is the forward diode voltage of an external diode connected across the drain and source terminals of said transistor.

5. A circuit as recited in claim 1 wherein said control circuit adjusts said reference signal upward when said detected Vds voltage is at a diode voltage potential for a duration greater than a first predefined time period.

6. A circuit as recited in claim 5 wherein said diode voltage potential is the forward body diode voltage of said transistor.

7. A circuit as recited in claim 5 wherein said diode voltage potential is the forward diode voltage of an external diode connected across the drain and source terminals of said transistor.

8. A circuit as recited in claim 1 wherein said transistor is turned off earlier in a second cycle if in a first cycle said transistor is off for a duration less than a predefined third time period.

9. A circuit as recited in claim 1 wherein a periodic ramp voltage is provided.

10. A circuit as recited in claim 9 wherein when the voltage potential of said ramp voltage and said reference voltage are at the same level, said transistor is operated.

11. A circuit as recited in claim 10 wherein said control circuit adjusts said reference signal downward when said detected Vds voltage is at a diode voltage potential for a duration less than a second predefined time period.

12. A circuit as recited in claim 11 wherein said diode voltage potential is the forward body diode voltage of said transistor.

13. A circuit as recited in claim 11 wherein said diode voltage potential is the forward diode voltage of an external diode connected across the drain and source terminals of said transistor.

14. A circuit as recited in claim 10 wherein said control circuit adjusts said reference signal upward when said detected Vds voltage is at a diode voltage potential for a duration greater than a first predefined time period.

15. A circuit as recited in claim 14 wherein said diode voltage potential is the forward diode voltage of an external diode connected across the drain and source terminals of said transistor.

16. A circuit as recited in claim 14 wherein said diode voltage potential is the forward body diode voltage of said transistor.

17. A circuit as recited in claim 10 wherein operating said transistor to turn off said transistor.

18. A method for operating a transistor as a rectifier, comprising the step of:
   detecting the Vds voltage of a transistor in a first cycle; and
   operating said transistor in a second cycle as a function of the duration of said detected Vds voltage in said first cycle.

19. A method as recited in claim 18 wherein in said operating step, applying Vgs voltage to said transistor in response to said detected Vds voltage such that the current travels in only one direction during said second cycle.

20. A method as recited in claim 18 wherein, in operating said transistor in said second cycle, the falling edge of the Vgs voltage leads the rising edge of the Vds voltage by an amount of time such that current travels in only one direction in said transistor during said second cycle.

21. A method as recited in claim 18 wherein a reference voltage is provided.

22. A method as recited in claim 21 wherein a ramp voltage is provided.

23. A method as recited in claim 22 wherein said reference voltage is adjusted as a function of said detected Vds voltage.

24. A method as recited in claim 23 wherein said transistor is operated when said reference voltage and said ramp voltage are in the same voltage potential range.

25. A method as recited in claim 24 wherein said reference voltage is adjusted upward when the Vds voltage of said transistor is at a diode voltage for a duration greater than a first predefined time period.

26. A method as recited in claim 24 wherein said reference voltage is adjusted downward when the Vds voltage of said transistor is at a diode voltage for a duration less than a second predefined time period.

27. A method as recited in claim 21 wherein said reference voltage is adjusted as a function of said detected Vds voltage.

28. A method as recited in claim 27 wherein said transistor is operated when said reference voltage and said detected Vds voltage of said transistor are in the same voltage potential range.

29. A method as recited in claim 28 wherein said reference voltage is adjusted upward when the Vds voltage of said transistor is at a diode voltage for a duration greater than a first predefined time period.

30. A method as recited in claim 28 wherein said reference voltage is adjusted downward when the Vds voltage of said transistor is at a diode voltage for a duration less than a second predefined time period.

31. A method as recited in claim 18 wherein said transistor is turned off earlier in a second cycle if in a first cycle said transistor is off for a duration less than a predefined third time period.

32. A method as recited in claim 18 wherein in said operating step, operating said transistor for a longer duration during said second cycle if said detected Vds voltage is at a particular diode voltage potential for a duration greater than a first predefined time period.

33. A method as recited in claim 18 wherein in said operating step, operating said transistor for a shorter duration during said second cycle if said detected Vds voltage is at a particular diode voltage potential for a duration less than a second predefined time period.

34. A method for operating a transistor as a rectifier, comprising the steps of:

generating a periodic ramp signal;

providing a reference signal having a particular voltage potential;

detecting for reverse current flow through said transistor;

adjusting said reference signal as a function of said detected reverse current flow; and operating said transistor wherein said reference signal and said ramp signal are at the same voltage potential.

35. A method as recited in claim 34 wherein said transistor is turned off earlier in a second cycle if in a first cycle said transistor is off for a duration less than a predefined third time period.

36. A method as recited in claim 34 further including before the adjusting step the step of detecting for Vds voltage of said transistor.

37. A method as recited in claim 36 wherein in said adjusting step, said reference signal is adjusted upward if said detected Vds voltage is at a particular diode voltage potential for duration greater than a first predefined time period.

38. A method as recited in claim 37 wherein said particular diode voltage potential is the forward body diode voltage of said transistor.

39. A method as recited in claim 37 wherein said particular diode voltage potential is the forward diode voltage of an external diode connected across the drain and source terminals of said transistor.

40. A method as recited in claim 36 wherein said adjusting step adjusts said reference voltage as a function of said detected reverse current flow and said detected Vds voltage of said transistor.

41. A method as recited in claim 40 wherein in said adjusting step, said reference signal is adjusted downward if said detected reverse current flow is detected.

42. A method as recited in claim 34 wherein said ramp signal is generated as a function of the switching frequency of a converter circuit.

43. A method as recited in claim 34 wherein in said operating step said transistor is turned off.

* * * * *